US011498320B2

(12) United States Patent
Rother et al.

(10) Patent No.: US 11,498,320 B2
(45) Date of Patent: Nov. 15, 2022

(54) MULTILAYER FILMS AND ADHESIVE TAPES

(71) Applicant: 3M INNOVATIVE PROPERTIES COMPANY, St. Paul, MN (US)

(72) Inventors: Christopher J. Rother, Hudson, WI (US); Jose P. De Souza, Austin, TX (US); Robert B. Rosner, Austin, TX (US); Jacob D. Young, St. Paul, MN (US); Jeffrey O. Emslander, Grant, MN (US); Gregg A. Patnode, Woodbury, MN (US); Ann R. Fornof, Austin, TX (US); Rafael Garcia-Ramirez, Austin, TX (US); Jay M. Krieger, Eau Claire, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 838 days.

(21) Appl. No.: 16/321,606

(22) PCT Filed: Jul. 24, 2017

(86) PCT No.: PCT/US2017/043483
§ 371 (c)(1),
(2) Date: Jan. 29, 2019

(87) PCT Pub. No.: WO2018/022495
PCT Pub. Date: Feb. 1, 2018

(65) Prior Publication Data
US 2021/0291502 A1    Sep. 23, 2021

Related U.S. Application Data

(60) Provisional application No. 62/368,626, filed on Jul. 29, 2016.

(51) Int. Cl.
*B32B 27/30* (2006.01)
*C09J 7/38* (2018.01)
*B32B 27/20* (2006.01)
*B32B 27/22* (2006.01)
*C09J 7/29* (2018.01)
*C09J 7/50* (2018.01)
*B32B 5/16* (2006.01)

(52) U.S. Cl.
CPC ............ *B32B 27/304* (2013.01); *B32B 5/16* (2013.01); *B32B 27/20* (2013.01); *B32B 27/22* (2013.01); *C09J 7/29* (2018.01); *C09J 7/383* (2018.01); *C09J 7/50* (2018.01); *B32B 2264/10* (2013.01); *B32B 2264/303* (2020.08); *B32B 2405/00* (2013.01); *C09J 2400/10* (2013.01); *C09J 2463/003* (2013.01)

(58) Field of Classification Search
None
See application file for complete search history.

(56) References Cited

U.S. PATENT DOCUMENTS

| | | |
|---|---|---|
| 3,027,337 A | 3/1962 | Tritsch |
| 4,379,806 A | 4/1983 | Korpman |
| 4,713,273 A | 12/1987 | Freedman |
| 5,407,970 A | 4/1995 | Peterson |
| 5,447,789 A | 9/1995 | Griffin |
| 5,500,293 A | 3/1996 | Lau |
| 5,539,033 A | 7/1996 | Bredahl |
| 5,660,922 A | 8/1997 | Herridge |
| 5,804,610 A | 9/1998 | Hamer |
| 6,040,027 A | 3/2000 | Freedman |
| 6,045,895 A | 4/2000 | Hyde |
| RE36,855 E | 9/2000 | Bredahl |
| 6,432,530 B1 | 8/2002 | Garcia-Ramirez |
| 7,022,406 B1 * | 4/2006 | Lefevre ............... B32B 7/12 428/328 |
| 9,187,678 B2 | 11/2015 | Boardman |
| 2006/0141247 A1 | 6/2006 | Bohm |
| 2013/0184393 A1 | 7/2013 | Satrijo |
| 2014/0039083 A1 | 2/2014 | Krepski |

FOREIGN PATENT DOCUMENTS

| | | |
|---|---|---|
| AU | 614623 | 1/1990 |
| CN | 1159400 | 7/2004 |
| CN | 101654600 | 2/2010 |
| CN | 101412591 | 3/2012 |
| CN | 203582789 | 5/2014 |
| CN | 204454982 | 7/2015 |
| CN | 105153959 | 12/2015 |
| DE | 102004021775 | 11/2005 |
| DE | 202014101183 | 6/2014 |
| DE | 1020140005855 A1 * | 10/2014 |
| EP | 0595669 | 5/1994 |
| EP | 1313818 | 5/2004 |
| EP | 2604664 | 6/2013 |
| GB | 994670 | 6/1965 |
| JP | H05-101712 | 5/1993 |
| JP | 2002-047460 | 2/2002 |
| KR | 10-0302672 | 9/2001 |
| WO | WO 2002-018507 | 3/2002 |
| WO | WO 2005-102670 | 11/2005 |
| WO | WO 2013-130238 | 9/2013 |
| WO | WO 2014-093139 | 6/2014 |
| WO | WO 2016-137793 | 9/2016 |
| WO | WO 2017-189304 | 11/2017 |

OTHER PUBLICATIONS

Wu et al., DE1020140005855A1, Oct. 23, 2014 (Year: 2014).*
Pocius, Adhesion and Adhesives: An Introduction, First Edition, 1997.
International Search Report for PCT International Application No. PCT/US2017/043483, dated Oct. 12, 2017, 5 pages.

* cited by examiner

*Primary Examiner* — Cheng Yuan Huang
(74) *Attorney, Agent, or Firm* — Gregg H. Rosenblatt

(57) ABSTRACT

Multilayer films and adhesive tapes that include such films, wherein the multilayer films include plasticized polyvinyl chloride and optionally one or more fillers.

10 Claims, 1 Drawing Sheet

MULTILAYER FILMS AND ADHESIVE TAPES

BACKGROUND

Electrical tapes, as well as tapes and adhesive sheets for other applications which require stretching, typically use a polyvinylchloride (vinyl) substrate, upon which the adhesive is coated. This material provides excellent mechanical properties such as elongation. Such vinyl materials are highly plasticized, with some containing up to 60 percent by weight (wt-%) plasticizers. Vinyl electrical tapes and sheets have traditionally been made by first applying a primer layer. This primer helps to isolate the vinyl and its plasticizers from the adhesive while providing the required anchorage of these two (in principle) incompatible layers. New and improved substrates (i.e., backings) for such tapes are desired, as are combinations of backings, primers, and adhesives that provide better control over costs of production and properties of such backings and adhesive tapes.

SUMMARY OF THE INVENTION

The present disclosure provides multilayer films and adhesive tapes that include such films. The multilayer films include plasticized polyvinyl chloride. Such multilayer films containing plasticized polyvinyl chloride are particularly useful in electrical tapes.

In one embodiment, a multilayer film is provided that includes one or more organic polymers, wherein at least one layer includes a plasticized polyvinyl chloride, and at least one layer comprises one or more fillers, and further wherein the layer comprising the plasticized polyvinyl chloride comprises more than 25 wt-% polyvinyl chloride, based on the total weight of the layer. Such multilayer film may be a vinyl backing for an adhesive. Thus, herein the term "vinyl backing" refers to a film containing polyvinyl chloride that may be used as a substrate for an adhesive composition.

In one embodiment, an adhesive tape is provided that includes: a backing including a multilayer film that includes one or more organic polymers; a primer layer disposed on at least one major surface of the backing; and a pressure sensitive adhesive layer disposed on the primer layer. In such tapes, at least one layer of the multilayer film backing includes a plasticized polyvinyl chloride, and at least one layer of the multilayer film backing includes one or more fillers.

In one embodiment, an adhesive tape is provided that includes: a backing including a multilayer film that includes one or more organic polymers, wherein at least one layer comprises a plasticized polyvinyl chloride; a primer layer disposed on at least one major surface of the backing; and a rubber-based pressure sensitive adhesive layer disposed on the primer layer.

The terms "backing layer(s)" and "backing" refer to an insulating film used to support the adhesive.

The terms "primer layer" and "tie-layer" refer to a layer that is coated (disposed) between the backing and an adhesive layer to enhance the anchorage of the adhesive to the backing.

The terms "polymer" and "polymeric material" include, but are not limited to, organic homopolymers, copolymers, such as for example, block (e.g., diblock, triblock), graft, random and alternating copolymers, and blends and modifications thereof. Furthermore, unless otherwise specifically limited, the term "polymer" shall include all possible geometrical configurations of the material. These configurations include, but are not limited to, isotactic, syndiotactic, and atactic symmetries. Furthermore, unless otherwise specifically limited, the term "copolymer" shall include polymers made of two or more different types of monomers, including terpolymers, tetrapolymers, etc.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain situations, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C. or 22° C. to 25° C.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

These FIGURES, which are idealized, are not to scale and are intended to be merely illustrative and nonlimiting.

DETAILED DESCRIPTION OF ILLUSTRATIVE EMBODIMENTS

The present disclosure provides multilayer films that include plasticized polyvinyl chloride and optionally one or more fillers. Such multilayer films can be used as backings for adhesive tapes. They are particularly useful in electrical tapes (referred to generally as vinyl electrical tapes).

In one embodiment, a multilayer film is provided that includes one or more organic polymers, wherein at least one layer includes a plasticized polyvinyl chloride, and at least one layer comprises one or more fillers, and further wherein the layer comprising the plasticized polyvinyl chloride comprises more than 25 wt-% polyvinyl chloride, based on the total weight of the layer. Such multilayer film may be a vinyl backing for an adhesive. Thus, herein the term "vinyl backing" refers to a film containing polyvinyl chloride that may be used as a substrate for an adhesive composition.

In one embodiment, an adhesive tape is provided that includes: a backing including a multilayer film that includes one or more organic polymers; a primer layer disposed on at least one major surface of the backing; and a pressure sensitive adhesive layer disposed on the primer layer. In such tapes, at least one layer of the multilayer film backing includes a plasticized polyvinyl chloride, and at least one layer of the multilayer film backing includes one or more fillers.

Figure 1A:
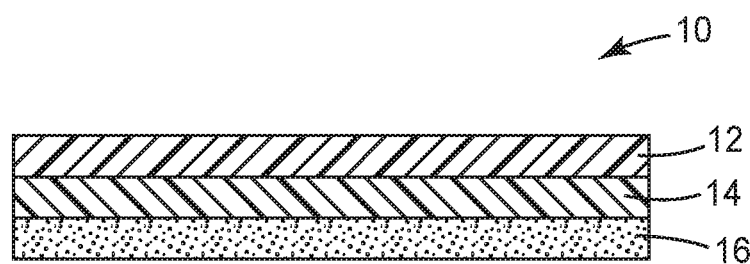
FIG. 1A is a cross section view of a tape according to one aspect of the invention.
Figure 1B:
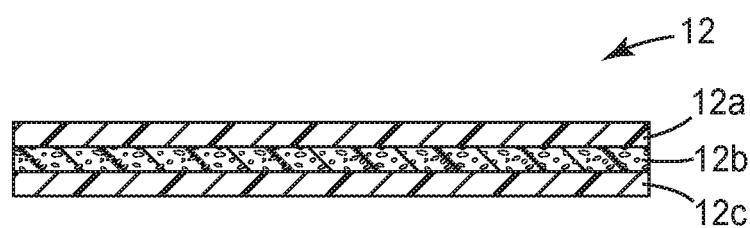
FIG. 1B is a cross section view of the multilayer film backing of the tape of FIG. 1A.

For example, FIG. 1A is a cross section view of a tape 10 that includes a backing film 12, a primer layer 14 disposed on the backing film 12, and a pressure sensitive adhesive 16 disposed on the primer layer 14. In one embodiment of the invention, as is shown in FIG. 1B, the backing film 12 comprises a multilayer film that includes a first surface layer 12a, a core layer 12b, and a second surface layer 12c. In this aspect, the core layer 12b can include one or more fillers. As described further herein, such a core layer can comprise one or more layers.

In one embodiment, an adhesive tape is provided that includes: a backing including a multilayer film that includes one or more organic polymers, wherein at least one layer comprises a plasticized polyvinyl chloride; a primer layer disposed on at least one major surface of the backing; and a rubber-based pressure sensitive adhesive layer disposed on the primer layer.

Multilayer Films and Backings

Multilayer films of the present disclosure may have a total thickness of no more than 762 microns (30 mils), or no more than 635 microns (25 mils), or no more than 508 microns (20 mils), or no more than 381 microns (15 mils), or no more than 254 microns (10 mils).

Each layer of the multilayer films of the present disclosure may be the same or different with respect to thickness. Each layer may have a thickness of at least 2.5 microns (0.1 mil). Each layer may have a thickness of up to 250 microns (10 mils).

Multilayer films of the present disclosure may include at least 2, or at least 3, or at least 4, or at least 5 layers. In certain embodiments, multilayer films may include up to 15, or up to 14, or up to 13, or up to 12, or up to 11, or up to 10 layers. Such layers may be the same or different with respect to thickness, composition, etc.

Varying the compositions of the various layers of a multilayer film provides advantages with respect to control of properties and performance, as well as cost. For example, lower cost materials can be used within the inner (core) layers. Also, properties such as cohesive strength, stiffness, cold flow, and tack, as well as chemical resistance and gas permeability may be varied and controlled by varying the compositions of the various layers of the multilayer films of the present disclosure.

Multilayer films of the present disclosure include one or more organic polymers, wherein at least one layer includes a plasticized polyvinyl chloride. In certain embodiments, at least one layer includes one or more fillers. In certain embodiments, each layer includes one or more fillers.

In certain embodiments, at least one layer includes plasticized polyvinyl chloride and one or more fillers.

In certain embodiments, the amount of polyvinyl chloride in a layer is more than 25 wt-%, or more than 30 wt-%, or more than 35 wt-%, or more than 40 wt-%, or more than 45 wt-%, or more than 50 wt-%, based on the total weight of the layer.

Such multilayer films may be used as backings in adhesive tapes, such as electrical tapes.

Each layer of the multilayer films of the present disclosure may be the same or different (e.g., same or different type and/or amount of filler, same or different type and/or amount of organic polymer, same or different type and/or amount of polyvinyl chloride, same or different type and/or amount of plasticizer).

In certain embodiments, each layer of the multilayer film includes plasticized polyvinyl chloride (which may be the same or different). The plasticized polyvinyl chloride may be selected from filled and unfilled grades of polyvinyl chloride resins, and said polyvinyl chloride resin having a K value of at least 50, or at least 60, or at least 70.

The one or more organic polymers may include a polyolefin (such as high-density polyethylene (HDPE), low-density polyethylene (LDPE), and polypropylene (PP)), a polyvinyl polymer (such as polyvinyl chloride (PVC) and polyvinyl acetate (PVA)), a polyolefin-based copolymer (such as ethylene-methacrylic acid copolymer (EEMA) and ethylene-vinyl acetate copolymer (EVA)), a block copolymer (such as acrylic block copolymers and styreneisoprene-vinyl acetate copolymer), a thermoplastic elastomer (TPE), or a combination thereof.

In certain embodiments, the plasticized polyvinyl chloride includes at least 10 wt-%, or at least 15 wt-%, or at least 20 wt-%, of one or more plasticizers, based on the total weight of the plasticized polyvinyl chloride. In certain embodiments, the plasticized polyvinyl chloride comprises up to 60 wt-%, or up to 50 wt-%, or up to 40 wt-%, of one or more plasticizers, based on the total weight of the plasticized polyvinyl chloride.

Exemplary plasticizers include an epoxidized vegetable oil, an epoxidized linseed oil, a mineral oil, an acetylated castor oil, a hydrogenated castor oil, an acetylated stearate ester, a furandicarboxylate, a dianhydrohexitol diester of 2-ethylheptanoic acid, a phthalate compound (such as diisononyl phthalate (DINP), diisodecyl phthalate (DIDP), and di-2-ethylhexyl phthalate (DEHP)), a terephthalate compound (such as dioctyl terephthalate), an adipate compound (such as di-2-ethylhexyl adipate (DEHA), di-isobutyl adipate (DIBA), di-isodecyl adipate (DIDA), di-isononyl adipate (DINA), and di-tridecyl adipate (DTDA)), and a trimellitate (such as tris(2-ethylhexyl) trimellitate), and a polymeric polyester-type plasticizer. Combinations of plasticizers may be used if desired.

Suitable fillers for use in multilayer films of the present disclosure may be organic fillers, inorganic fillers, or combinations thereof.

Exemplary inorganic fillers include nepheline syenite, ceramic, glass, graphite, pigments (such as $TiO_2$ and boron nitride), oxides (such as zinc oxide, magnesium oxide, antimony trioxide, alumina trihydrate, silicone dioxide (i.e., silica)), hydroxides (such as aluminum hydroxide and magnesium hydroxide), inorganic salts (such as $CaCO_3$, $BaSO_4$, $CaSO_4$, phosphates, and hydrotalcite), silicates (such as talc, mica, kaolin, wollastonite, montmorillonite, diatomite, feldspar), or combinations thereof. In certain embodiments, the inorganic filler includes calcium carbonate.

Exemplary organic fillers include natural or synthetic polymer fillers, such as cellulose fibers, wood flour, wood fibers, flax, cotton, sisal, starch, recycled rubber crumb, recycled vinyl crumb, flakes, or pellets, or combinations thereof.

The fillers may include particulate of any of a variety of shapes (including fibers, spheres, beads, irregular particles) and sizes. In certain embodiments, the fillers include nano-sized particulate up to a size that is compatible with the extrusion process and not be so large that the particulate interferes with the film properties. In certain embodiments, the fillers include particulate having an average particle size (largest dimension of the particulate, e.g., diameter of spherical particles or length of fibers) of 1 micron to 50 microns.

Optional additives may be used in the multilayer films of the present disclosure including, for example, colorants, processing aids, flame retardants, crosslinking agents, antioxidants, anti-smoke additives, and the like.

In certain embodiments, multilayer films of the present disclosure include a core and two surface layers (i.e., skin layers). In certain embodiments, the core includes one or more layers.

In certain embodiments, at least one layer of the core includes one or more fillers.

In certain embodiments, there are no internal (core) layers that include a pressure sensitive adhesive.

In certain embodiments, each surface layer includes one or more fillers. In certain embodiments, each surface layer is the same material. That is, in certain embodiments, each surface layer of a multilayer film includes the same composition (e.g., organic polymer, filler, additives).

In certain embodiments, the amount and/or type of filler in the core is different than the amount and/or type of filler in the surface layers.

In certain embodiments, one or more layers include at least 0.01 wt-%, or at least 0.1 wt-%, or at least 1 wt-%, or at least 5 wt-%, or at least 10 wt-%, or at least 15 wt-%, or at least 20 wt-%, of one or more fillers, in a layer.

In certain embodiments, one or more layers include up to 80 wt-%, or up to 70 wt-%, or up to 60 wt-%, or up to 50 wt-%, or up to 40 wt-%, or up to 30 wt-%, of one or more fillers, in a layer.

Adhesives

The multilayer films of the present disclosure may be a substrate on which an adhesive is disposed, thereby forming an adhesive tape.

The adhesive used in adhesive tapes of the present disclosure can be a pressure sensitive adhesive. It is not particularly restricted and may be any of a wide variety of known pressure sensitive adhesives. Pressure sensitive adhesives are a distinct category of adhesives and a distinct category of thermoplastics, which in dry (solvent-free) form are aggressively, and permanently, tacky at room temperature. They firmly adhere to a variety of dissimilar surfaces upon mere contact without the need of more than finger or hand pressure. Pressure sensitive adhesives require no activation by water, solvent, or heat to exert a strong adhesive holding force. They are sufficiently cohesive and elastic in nature so that, despite their aggressive tackiness, they can be handled with the fingers and removed from smooth surfaces without leaving a residue. Pressure sensitive adhesives can be quantitatively described using the "Dahlquist criteria" which maintains that the elastic modulus of these materials is less than $10^6$ dynes/$cm^2$ at room temperature (see, for example, Pocius, A. V., Adhesion & Adhesives: An Introduction, Hanser Publishers, New York, N.Y., First Edition, 1997).

Suitable pressure sensitive adhesives for use in the adhesive tapes of the present disclosure may be made via a wide variety of techniques. They may include an emulsion pressure sensitive adhesive, a solvent-borne pressure sensitive adhesive, a photo-polymerizable pressure sensitive adhesive, a hot melt pressure sensitive adhesive (i.e., hot melt extruded pressure sensitive adhesive), or a combination thereof.

Exemplary pressure sensitive adhesives include an acrylic pressure sensitive adhesive, a rubber-based pressure sensitive adhesive, a vinyl alkyl ether pressure sensitive adhesive, a silicone pressure sensitive adhesive, a polyester pressure sensitive adhesive, a polyamide pressure sensitive adhesive, a urethane pressure sensitive adhesive, a fluorinated pressure sensitive adhesive, an epoxy pressure sensitive adhesive, a block copolymer-based pressure sensitive adhesive, or a combination thereof.

In certain embodiments, the pressure sensitive adhesive (PSA) includes a rubber-based pressure sensitive adhesive. Rubber-based pressure sensitive adhesives typically include natural or synthetic rubber, a tackifying resin, an antioxidant, and other additives or fillers as required. Exemplary rubber-based adhesive formulations are described in U.S. Pat. Nos. 5,500,293, 6,432,530, and RE36855.

In certain embodiments, the rubber-based pressure sensitive adhesive includes a styrene-butadiene copolymer, a styrene-isoprene-styrene copolymer, a polyisoprene homopolymer, a polybutadiene homopolymer, or a combination thereof.

In certain embodiments, the rubber-based pressure sensitive adhesive comprises a polyisoprene homopolymer.

In certain embodiments, the rubber-based pressure sensitive adhesive includes a mixture or blend of polyisoprene homopolymer and a styrene-isoprene-styrene copolymer. In certain embodiments, the rubber-based pressure sensitive adhesive includes at least 13 wt-% of a polyisoprene homopolymer. In certain embodiments, the rubber-based pressure sensitive adhesive includes up to 42 wt-% of a polyisoprene homopolymer. In certain embodiments, the rubber-based pressure sensitive adhesive includes at least 13 wt-% of a styrene-isoprene-styrene copolymer. In certain embodiments, the rubber-based pressure sensitive adhesive includes up to 42 wt-% of a styrene-isoprene-styrene copolymer.

In certain embodiments, the rubber-based pressure sensitive adhesive further includes an end-block reinforcing resin. Certain adhesive compositions may contain at least 2 wt-%, or at least 5 wt-%, of an end-block reinforcing resin. Certain adhesive compositions may contain up to 20 wt-%, or up to 15 wt-%, of an end-block reinforcing resin. The reinforcing end-block resin may be an aromatic, essentially hydrocarbon resin, which generally has a glass transition temperature higher than that of the adhesive application temperature. Useful resins include low molecular weight oligomers and polymers of styrene and α-methylstyrene and p-methylstyrene, and copolymers thereof. Examples include those commercially available under the tradenames ENDEX 155 and 160, KRISTALEX 5140 and 1120, from Eastman Chemical Company (Kingsport, Tenn.).

In certain embodiments, the rubber-based pressure sensitive adhesive further includes a solid tackifying agent. Examples of solid tackifying agents (i.e., tackifying resins) include aliphatic resins (e.g., C5 resins), aromatic resins (e.g., C9 resins), terpene-based resins, and rosin resins (e.g., rosin esters, hydrogenated rosin resins, and dimerized rosin resins which can be obtained, for example, from Eastman (Kingsport, Tenn.)). If used, one or more tackifying agents can be used in an amount of at least 25 wt-%, or at least 30 wt-%, based on the total weight of the adhesive composition. If used, one or more tackifying agents can be used in an amount of up to 55 wt-% or up to 45 wt-%, based on the total weight of the adhesive composition.

In certain embodiments, the rubber-based pressure sensitive adhesive further includes a multifunctional crosslinking agent (particularly a (meth)acrylate crosslinking agent). Examples of multifunctional crosslinking agents include butanediol diacrylate, hexanediol diacrylate, divinylbenzene, and other latent crosslinking agents such as reactive phenolics. If used, one or more crosslinking agents can be used in an amount of at least 0.5 wt-%, or at least 1 wt-%, based on the total weight of the adhesive composition. If used, one or more crosslinking agents can be used in an amount of up to 10 wt-%, or up to 5 wt-%, based on the total weight of the adhesive composition.

In certain embodiments, pressure sensitive adhesives of the disclosure include one or more fillers. Suitable fillers for use in pressure sensitive adhesives of the present disclosure may be organic fillers, inorganic fillers, or combinations thereof.

Exemplary inorganic fillers include nepheline syenite, ceramic, glass, graphite, pigments (such as $TiO_2$ and boron nitride), oxides (such as zinc oxide, magnesium oxide, antimony trioxide, alumina trihydrate, silicone dioxide (i.e., silica)), hydroxides (such as aluminum hydroxide and magnesium hydroxide), inorganic salts (such as $CaCO_3$, $BaSO_4$, $CaSO_4$, phosphates, and hydrotalcite), silicates (such as talc, mica, kaolin, wollastonite, montmorillonite, diatomite, feldspar), or combinations thereof. In certain embodiments, the inorganic filler includes calcium carbonate.

Exemplary organic fillers include natural or synthetic polymer fillers, such as cellulose fibers, wood flour, wood fibers, flax, cotton, sisal, starch, recycled rubber crumb, recycled vinyl crumb, flakes, or pellets, or combinations thereof.

The fillers may include particulate of any of a variety of shapes (including fibers, spheres, beads, irregular particles) and sizes. In certain embodiments, the fillers include nano-sized particulate up to a size that is compatible with adhesive processing. In certain embodiments, the fillers include particulate having an average particle size (largest dimension of the particulate, e.g., diameter of spherical particles or length of fibers) of 1 micron to 50 microns.

In certain embodiments, a PSA layer includes at least 0.01 wt-%, or at least 0.1 wt-%, or at least 1 wt-%, or at least 5 wt-%, or at least 10 wt-%, or at least 15 wt-%, or at least 20 wt-%, of one or more fillers, in the PSA layer.

In certain embodiments, a PSA layer includes up to 80 wt-%, or up to 70 wt-%, or up to 60 wt-%, or up to 50 wt-%, or up to 40 wt-%, or up to 30 wt-%, of one or more fillers, in the PSA layer.

Primers

Suitable primers for use in enhancing the adhesion of the adhesive to the multilayer adhesive backings described herein can include a variety of materials. The primers can include homopolymers and/or copolymers. The primers typically include an elastomeric polymer.

A primer layer can be solvent coated onto one surface of the backing layer or coextruded with and formed on one side of the backing layer. Although in certain embodiments, the primer layer is solventless, it can include residual solvent, particularly if coated out of solvent.

Exemplary elastomeric polymers for use in the primers of the present disclosure include an epoxidized polymer. In certain embodiments, the epoxidized polymer includes a concentration of epoxidized units of at least 0.5 wt-%. In certain embodiments, the epoxidized polymer has a concentration of epoxidized units of at least 1 wt-%, or at least 2 wt-%, or at least 3 wt-%, or at least 4 wt-%, or at least 5 wt-%. In certain embodiments, the epoxidized polymer has a concentration of epoxidized units of up to 10 wt-%.

Examples of such epoxidized polymers include an epoxidized conjugated diene polymer, an epoxidized butadiene-containing copolymer, an epoxidized styrene-butadiene copolymer, an epoxidized styrene-isoprene polymer, and an epoxidized acrylonitrile-butadiene copolymer. For example, epoxidized styrene-butadiene block copolymers are available under the tradename EPOFRIEND from Daicel Corporation (Fort Lee, N.J.).

Methods

As would be understood by one of ordinary skill in the art given the present description, the multilayer film and tape embodiments described herein can be formed using any number of well-known processes/techniques. Exemplary well-known processes/techniques are described in U.S. Pat. Nos. 4,713,273, 5,407,970, 5,804,610, and 6,040,027, U.S. Patent Publication Nos. 2014/0039083, 2013/30238, and 2013/0184393, International Publication Nos. WO 2013/130238 and 2014/093139, and Australian Patent No. AU614623.

EXAMPLES

Materials

| Designation | Description |
| --- | --- |
| PVC1 | Geon ™ Vinyl Flexible D6500 Flexible Polyvinyl Chloride from PolyOne (Avon Lake, OH) black. |
| PVC2 | Geon ™ Vinyl Flexible A7000 Trans 9423 Flexible Polyvinyl Chloride from PolyOne (Avon Lake, OH). |
| PVC3 | Geon ™ Vinyl Flexible C7000 Flexible Polyvinyl Chloride from PolyOne (Avon Lake, OH) white. |
| Wingtack PLUS | Wingtack ® PLUS, C5, C9 is a highly aliphatic tackifying resin available from Total Cray Valley (Exton, PA). |
| Endex 160 | Endex ™ 160 Hydrocarbon Resin, a water-white thermoplastic end blocking resin made from purified aromatic hydrocarbon monomers available from Eastman Chemical Company (Kingsport, TN). |
| D1161 | Kraton ® D1161 Polymer is a clear, linear triblock copolymer based on styrene and isoprene, with a polystyrene content of 15% available from Kraton Polymers U.S. LLC (Houston, TX). |
| N2210 | Natsyn 2210 is a high cis-1,4 (98.5% Typical) polyisoprene containing a nonstaining antioxidant available from Goodyear Chemical (Akron, OH). |
| EPO | EPOFRIEND AT501 is an epoxy-modified styrene-butadiene-styrene copolymer available from Daicel Corporation (Tokyo, Japan). |

Test Methods

Vinyl Layer Thickness Measurement

The thickness of each layer was determined using a Keyence VHX-1000 digital optical microscope.

Total Thickness Measurement

The total sample thicknesses were measured with a Mahr Federal μmaxμm II XL thickness gauge.

Adhesion

Peel adhesion to a given substrate was determined with a method based on ASTM D1000 except dwell times were 10 minutes against each substrate. For example, when testing the adhesion to steel (ATS), a 10 in. long by up to 1 inch wide sample was applied to a cleaned stainless steel plate with two passes of a 4.4 lbs. roller. An IMASS TL-2200 peel tester was used to test adhesion to steel at 1800 and 12 inches/minute.

To test the adhesion of the adhesive to the backing material (ATB), a length of the exemplary sample is applied to the surface of a steel plates such that the free end are wrapped around the ends of the plate. Next a test sample 10 inches long and up to 1 inch wide is applied over the adhered sample and rolled down with two passes of a 4.4 lbs. roller. Similar equipment and test conditions are used for adhesion to backing tests. The adhesion results for the adhesive tape comprising a multilayer vinyl films are provided in Table 4.

Tensile and Elongation:

A 4.5-6" long and 0.5" wide sample was placed between the grips of an Instron MTS Insight 5, which were set at a gap of 4". The head speed was at 12"/min. The tests were performed in triplicate for each sample. The elongation and tensile strength were recorded for each sample, and the percent elongation was calculated. The tensile and elongation results for the multilayer vinyl films and the adhesive tape comprising a multilayer vinyl films are provided in Table 4.

Sample Preparation

Preparation of the Vinyl Multilayer Films

Two-layer vinyl films were formed by feeding the pre-compounded, plasticized polyvinyl chloride into a 1" diameter single screw extruder now available from Davis-Standard, LLC (Pawcatuck, Conn.) that was outfitted with a 6 in. (15.24 cm) film die now available from Nordson Extrusion Dies Industries, LLC (Chippewa Falls, Wis.). The extruder and die temperatures were set to 350° F. (177° C.), and the extruder ran at 25 revolutions per minute. A second vinyl compound was fed through the same extruder and film-forming die. The extruder and die temperatures were additionally set to 350° F. (177° C.), and the extruder ran at 25 revolutions per minute Thirty-inch (0.76-m) samples of the secondary vinyl material were applied to the surface of the first vinyl layer and laminated together by feeding through a nip roll (at 50° C.).

Multilayer vinyl films constructions having more than two vinyl layers were prepared by stacking designated two-layer vinyl film samples and laminating them together in a Midvale-Heppenstall (Nicetown, Philadelphia, Pa., USA) hot press with the platens at 374° F. and at 10,000 lbs-f of pressure for 10 seconds.

Exemplary multilayer vinyl film constructions are provided in Table 1 with the thickness of each layer provided in Table 2.

TABLE 1

Multilayer vinyl film constructions

| Example | Layer 1 | Layer 2 | Layer 3 | Layer 4 | Layer 5 | Layer 6 |
| --- | --- | --- | --- | --- | --- | --- |
| 1 | PVC1 | PVC2 | | | | |
| 2 | PVC2 | PVC3 | | | | |
| 3 | PVC1 | PVC3 | | | | |
| 4 | PVC1 | PVC3 | PVC1 | PVC3 | | |
| 5 | PVC1 | PVC2 | PVC1 | PVC2 | | |
| 6 | PVC2 | PVC3 | PVC2 | PVC3 | | |
| 7 | PVC2 | PVC3 | PVC1 | PVC3 | PVC1 | PVC2 |

TABLE 2

Layer thicknesses in multilayer vinyl films

| Example | Layer 1 (mm) | Layer 2 (mm) | Layer 3 (mm) | Layer 4 (mm) | Layer 5 (mm) | Layer 6 (mm) |
| --- | --- | --- | --- | --- | --- | --- |
| 1 | 0.19 | 0.12 | | | | |
| 2 | 0.14 | 0.17 | | | | |
| 3 | 0.19 | 0.15 | | | | |
| 4 | 0.15 | 0.17 | 0.17 | 0.11 | | |
| 5 | 0.11 | 0.07 | 0.12 | 0.07 | | |
| 6 | 0.14 | 0.11 | 0.10 | 0.15 | | |
| 7 | 0.09 | 0.12 | 0.11 | 0.11 | 0.11 | 0.09 |

Preparation of the Adhesive

Examples were prepared using a compounding and coating apparatus for processing natural and synthetic non-thermoplastic elastomer hot melt based PSA described in U.S. Pat. No. 5,539,033 (Bredahl et al.).

Styrene-isoprene-styrene block copolymer (Kraton D1161) was fed into Barrel Section 1 of a 30 mm diameter fully intermeshing co-rotating TSE (Werner-Pfleiderer (now Coperion GmbH) Model ZSK-30, having a LID of 36:1) having conveying and kneading sections, at a rate of 18.0 g/min using a K-Tron (Coperion K-Tron, Sewell, N.J.), loss-in-weight feeder which continuously monitored the weight of the material in the hopper. A C5, C9 is a highly aliphatic tackifiying resin (Wingtack® PLUS) was added into Barrel Zone 1 of the twin screw extruder at a rate of 3.6 g/min using a K-Tron loss-in-weight feeder which continuously monitored the weight of the material in the hopper. Cis-1,4 polyisoprene resin (Natsyn 2210) was added into Barrel Zone 2 of the twin screw extruder at a rate of 18.0 g/min using a bulk feeder available from Bonnot Company (Green, Ohio, Model No. B-6661), a 3.0 cc/rev ZENITH gear pump. (Zenith Pumps/Colfax Corporation, Monroe, N.C.) and a flexible hose, all at a temperature of 121° C. An additional 25.2 g/min C5, C9 is a highly aliphatic tackifiying resin was added to Barrel Zone 4 of the twin screw extruder at a rate of 3.6 g/min using a K-Tron loss-in-weight feeder which continuously monitored the weight of the material in the hopper. 10.8 g/min of a thermoplastic end blocking hydrocarbon resin (Endex™ 160) was added to Barrel Zone 6 of the twin screw extruder using a K-Tron loss-in-weight feeder which continuously monitored the weight of the material in the hopper.

Barrel Zone 1 was set at a temperature of 60° C. Barrel Zone 2 was set at a temperature of 66° C. Barrel Zone 3 was set at a temperature of 66° C. Barrel Zone 4 was set at a temperature of 66° C. Barrel Zone 5 was set at a temperature of 93° C. Barrel Zone 6 was set at a temperature of 93° C. Barrel Zones 7 through 12 were set at a temperature of 149° C. The adhesive was transported through the remaining zones of the extruder and delivered to a 3.0 cc/rev ZENITH gear pump. (Zenith Pumps/Colfax Corporation, Monroe, N.C.). The gear pump was set to deliver 75.6 g/min of adhesive to a 6 inch extrusion die as described in U.S. Reissue Pat. No. 36,855 (Bredahl et al.) set at a temperature of 149° C. which coated the adhesive on a commercial release liner. An adhesive film was produced having a thickness of approximately 1.2 mils (30.5 microns).

Preparation of Adhesive Tape Samples Comprising a Multilayer Vinyl Films

A 10% solution of EPO dissolved in toluene was coated with a #14 Meyer bar onto a section of a multilayer vinyl film. The coating was dried at ambient conditions for more than 24 hours prior to laminating the adhesive film to the EPO primer layer surface. The adhesive was place against the primer surface and the adhesive/primer/vinyl construction was laminated together at 90° C. on an LPA 3301 laminator, available from Fujipla, Inc. at a speed setting of 2. The constructions were passed through the laminator twice.

The multilayer vinyl films from examples 2 and 7 were pressed in a Midvale-Heppenstall (Nicetown, Philadelphia, Pa., USA) hot press, where the platens were at 374° F., at 10,000 lbs.-f of pressure for 10 seconds and shims of 0.25 mm (5 mil) thickness were placed between the platens to ensure a thickness of at least 0.25 mm (5 mil) of the pressed multilayer vinyl film. These pressed multilayer vinyl films were treated the same as the previously described adhesive samples and are referred to as examples 11 and 12, respectively, in the table below Exemplary adhesive tape constructions are summarized in Table 3.

TABLE 3

Adhesive tape constructions comprising multilayer vinyl films

| Example | Layer 1 | Layer 2 | Layer 3 | Layer 4 | Layer 5 | Layer 6 | Layer 7 | Layer 8 |
|---|---|---|---|---|---|---|---|---|
| 8 | Adhesive | EPO | PVC1 | PVC2 | | | | |
| 9 | Adhesive | EPO | PVC2 | PVC3 | | | | |
| 10 | Adhesive | EPO | PVC1 | PVC3 | | | | |
| 11 | Adhesive | EPO | PVC2 | PVC3 | | | | |
| 12 | Adhesive | EPO | PVC2 | PVC3 | PVC1 | PVC3 | PVC1 | PVC2 |

TABLE 4

Mechanical properties of the multilayer vinyl films and adhesion properties of the adhesive tapes comprising multilayer vinyl films

| Example | Total Sample Thickness (mm) | % Elongation at Break | Tensile Strength (MPa) | ATS (N/dm) | ATB (N/dm) |
|---|---|---|---|---|---|
| 1 | 0.33 | 329 | 8.53 | | |
| 2 | 0.29 | 274 | 8.13 | | |
| 3 | 0.32 | 314 | 8.06 | | |
| 4 | 0.59 | 152 | 4.57 | | |
| 5 | 0.45 | 241 | 6.31 | | |
| 6 | 0.43 | 239 | 7.35 | | |
| 7 | 0.56 | 188 | 5.36 | | |
| 8 | 0.35 | 372 | 8.77 | 0.84 | 0.39 |
| 9 | 0.34 | 361 | 8.89 | 0.86 | 0.41 |
| 10 | 0.33 | 373 | 9.98 | 0.64 | 0.52 |
| 11 | 0.23 | | | 1.23 | 0.46 |
| 12 | 0.24 | | | 1.47 | 0.42 |

Exemplary Embodiments

SET 1—Filled Multilayer Film

Embodiment 1 is a multilayer film comprising one or more organic polymers, wherein at least one layer comprises a plasticized polyvinyl chloride, and at least one layer comprises one or more fillers (in some embodiments at least one layer comprises plasticized polyvinyl chloride and one or more fillers); wherein the layer comprising the plasticized polyvinyl chloride comprises more than 25 wt-% polyvinyl chloride (or more than 30 wt-%, or more than 35 wt-%, or more than 40 wt-%, or more than 45 wt-%, or more than 50 wt-%), based on the total weight of the layer.

Embodiment 2 is the multilayer film of embodiment 1 wherein at least one layer comprises plasticized polyvinyl chloride and one or more fillers (in some embodiments, the multilayer film has a total thickness of no more than 762 microns (30 mils), or no more than 635 microns (25 mils), or no more than 508 microns (20 mils), or no more than 381 microns (15 mils), or no more than 254 microns (10 mils)).

Embodiment 3 is the multilayer film of embodiment 1 or 2 wherein the one or more fillers comprise an inorganic filler (in some embodiments, the inorganic filler comprises nepheline syenite, ceramic, glass, graphite, pigments (such as $TiO_2$ and boron nitride), oxides (such as zinc oxide, magnesium oxide, antimony trioxide, alumina trihydrate, silicone dioxide (i.e., silica)), hydroxides (such as aluminum hydroxide and magnesium hydroxide), inorganic salts (such as $CaCO_3$, $BaSO_4$, $CaSO_4$, phosphates, and hydrotalcite), silicates (such as talc, mica, kaolin, wollastonite, montmorillonite, diatomite, feldspar), or combinations thereof).

Embodiment 4 is the multilayer film of embodiment 3 wherein the inorganic filler comprises calcium carbonate.

Embodiment 5 is the multilayer film of embodiment 1 or 2 wherein the one or more fillers comprise an organic filler (which may be made of a natural or synthetic polymer).

Embodiment 6 is the multilayer film of embodiment 5 wherein the organic filler comprises cellulose fibers, wood flour, wood fibers, flax, cotton, sisal, starch, recycled rubber crumb, recycled vinyl crumb, flakes, or pellets, or combinations thereof.

Embodiment 7 is the multilayer film of any one of embodiments 1 through 6 wherein the one or more fillers comprise particulate (of any of a variety of shapes including fibers, spheres, beads, irregular particles) comprising nano-sized particulate up to a size that is compatible with the extrusion process and not be so large that the particulate interferes with the film properties.

Embodiment 8 is the multilayer film of embodiment 7 wherein the one or more fillers comprise particulate having an average particle size (largest dimension of the particulate, e.g., diameter of spherical particles or length of fibers) of 1 micron to 50 microns.

Embodiment 9 is the multilayer film of any one of embodiments 1 through 8 comprising at least 2, or at least 3, or at least 4, or at least 5 layers.

Embodiment 10 is the multilayer film of any one of embodiments 1 through 9 comprising up to 15, or up to 14, or up to 13, or up to 12, or up to 11, or up to 10 layers.

Embodiment 11 is the multilayer film of any one of embodiments 1 through 10 comprising a core and two surface layers.

Embodiment 12 is the multilayer film of embodiment 11 wherein the core comprises one or more layers.

Embodiment 13 is the multilayer film of embodiment 12 wherein at least one layer of the core comprises one or more fillers.

Embodiment 14 is the multilayer film of any one of embodiments 11 through 13 wherein each surface layer comprises one or more fillers.

Embodiment 15 is the multilayer film of embodiment 13 or 14 wherein the amount and/or type of filler in the core is different than the amount and/or type of filler in the surface layers.

Embodiment 16 is the multilayer film of any one of embodiments 1 through 15 wherein each layer may be the same or different (e.g., same or different type and/or amount of filler, same or different type and/or amount of organic polymer, same or different type and/or amount of polyvinyl chloride, same or different type and/or amount of plasticizer).

Embodiment 17 is the multilayer film of any one of embodiments 1 through 16 wherein each layer comprises plasticized polyvinyl chloride (which may be the same or different, and which may be selected from filled and unfilled grades of polyvinyl chloride resins such as the polyvinyl chloride resin may be selected from available grades with K values of at least 50, or at least 60, or at least 70.

Embodiment 18 is the multilayer film of any one of embodiments 1 through 17 wherein each layer comprises one or more fillers.

Embodiment 19 is the multilayer film of any one of embodiments 1 through 18 wherein one or more layers comprises at least 0.01 wt-%, or at least 0.1 wt-%, or at least 1, or at least 5 wt-%, or at least 10 wt-%, or at least 15 wt-%, or at least 20 wt-%, of one or more fillers, in a layer.

Embodiment 20 is the multilayer film of any one of embodiments 1 through 19 wherein one or more layers comprise up to 80 wt-%, or up to 70 wt-%, or up to 60 wt-%, or up to 50 wt-%, or up to 40 wt-%, or up to 30 wt-%, of one or more fillers, in a layer. Embodiment 21 is the multilayer film of any one of embodiments 1 through 20 wherein the plasticized polyvinyl chloride comprises at least 10 wt-%, or at least 15 wt-%, or at least 20 wt-%, of one or more plasticizers, based on the total weight of the plasticized polyvinyl chloride.

Embodiment 22 is the multilayer film of any one of embodiments 1 through 21 wherein the plasticized polyvinyl chloride comprises up to 60 wt-%, or up to 50 wt-%, or up to 40 wt-%, of one or more plasticizers, based on the total weight of the plasticized polyvinyl chloride.

Embodiment 23 is the multilayer film of any one of embodiments 1 through 22 wherein the plasticized polyvinyl chloride comprises one or more plasticizers selected from the group consisting of an epoxidixed vegetable oil, an epoxidized linseed oil, a mineral oil, an acetylated castor oil, a hydrogenated castor oil, an acetylated stearate ester, a furandicarboxylate, a dianhydrohexitol diester of 2-ethylheptanoic acid, a phthalate compound (such as diisononyl phthalate (DINP), diisodecyl phthalate (DIDP), and di-2-ethylhexyl phthalate (DEHP)), a terephthalate compound (such as dioctyl terephthalate), an adipate compound (such as di-2-ethylhexyl adipate (DEHA), di-isobutyl adipate (DIBA), di-isodecyl adipate (DIDA), di-isononyl adipate (DINA), and di-tridecyl adipate (DTDA)), and a trimellitate (such as tris(2-ethylhexyl) trimellitate), a polymeric polyester-type plasticizer, and a combination thereof.

Embodiment 24 is the multilayer film of any one of embodiments 1 through 23 wherein the one or more organic polymers comprises a polyolefin (such as high-density polyethylene (HDPE), low-density polyethylene (LDPE), and polypropylene (PP)), a polyvinyl polymer (such as polyvinyl chloride (PVC) and polyvinyl acetate (PVA)), a polyolefin-based copolymer (such as ethylene-methacrylic acid copolymer (EEMA) and ethylene-vinyl acetate copolymer (EVA)), a block copolymer (such as acrylic block copolymers and styreneisoprene-vinyl acetate copolymer), a thermoplastic elastomer (TPE), or a combination thereof.

Embodiment 25 is the multilayer film of any one of embodiments 1 through 24 having an adhesive disposed thereon.

SET 2—an Adhesive Tape with a Filled Multilayer Backing, a PSA, and a Primer

Embodiment 1 is an adhesive tape comprising: a backing comprising a multilayer film comprising one or more organic polymers, wherein at least one layer comprises a plasticized polyvinyl chloride, and at least one layer comprises one or more fillers; a primer layer disposed on at least one major surface of the backing; and a pressure sensitive adhesive layer disposed on the primer layer.

Embodiment 2 is the adhesive tape of embodiment 1 wherein at least one layer of the multilayer film comprises plasticized polyvinyl chloride and one or more fillers (in some embodiments of the adhesive tape, the multilayer film has a total thickness of no more than 760 microns (30 mils), or no more than 635 microns (25 mils), or no more than 508 microns (20 mils), or no more than 381 microns (15 mils), or no more than 254 microns (10 mils)).

Embodiment 3 is the adhesive tape of embodiment 1 or 2 wherein at least one layer of the multilayer film comprises plasticized polyvinyl chloride and one or more fillers (in some embodiments, the amount of polyvinyl chloride in a layer is more than 25 wt-%, or more than 30 wt-%, or more than 35 wt-%, or more than 40 wt-%, or more than 45 wt-%, or more than 50 wt-%, based on the total weight of the layer).

Embodiment 4 is the adhesive tape of any one of embodiments 1 through 3 wherein the one or more fillers comprise an inorganic filler (in some embodiments, the inorganic filler comprises nepheline syenite, ceramic, glass, graphite, pigments (such as $TiO_2$ and boron nitride), oxides (such as zinc oxide, magnesium oxide, antimony trioxide, alumina trihydrate, silicone dioxide (i.e., silica)), hydroxides (such as aluminum hydroxide and magnesium hydroxide), inorganic salts (such as $CaCO_3$, $BaSO_4$, $CaSO_4$, phosphates, and hydrotalcite), silicates (such as talc, mica, kaolin, wollastonite, montmorillonite, diatomite, feldspar), or combinations thereof).

Embodiment 5 is the adhesive tape of any one of embodiments 1 through 3 wherein the one or more fillers comprise an organic filler (which may be made of a natural or synthetic polymer).

Embodiment 6 is the adhesive tape of embodiment 5 wherein the organic filler comprises cellulose fibers, wood flour, wood fibers, flax, cotton, sisal, starch, recycled rubber crumb, recycled vinyl crumb, flakes, or pellets, or combinations thereof.

Embodiment 7 is the adhesive tape of any one of embodiments 1 through 6 wherein the one or more fillers comprise particulate (of any of a variety of shapes including fibers, spheres, beads, irregular particles) comprising nano-sized particulate up to a size that is compatible with the extrusion process and not be so large that the particulate interferes with the film properties.

Embodiment 8 is the adhesive tape of embodiment 7 wherein the one or more fillers comprise particulate having an average particle size (largest dimension of the particulate, e.g., diameter of spherical particles or length of fibers) of 1 micron to 50 microns.

Embodiment 9 is the adhesive tape of any one of embodiments 1 through 8 wherein the multilayer film backing comprises at least 2, or at least 3, or at least 4, or at least 5 layers.

Embodiment 10 is the adhesive tape of any one of embodiments 1 through 9 wherein the multilayer film backing comprises up to 15, or up to 14, or up to 13, or up to 12, or up to 11, or up to 10 layers.

Embodiment 11 is the adhesive tape of any one of embodiments 1 through 10 wherein the multilayer film backing comprises a core and two surface layers.

Embodiment 12 is the adhesive tape of embodiment 11 wherein the core comprises one or more layers.

Embodiment 13 is the adhesive tape of embodiment 12 wherein at least one layer of the core comprises one or more fillers.

Embodiment 14 is the adhesive tape of any one of embodiments 11 through 13 wherein each surface layer comprises one or more fillers.

Embodiment 15 is the adhesive tape of embodiment 13 or 14 wherein the amount and/or type of filler in the core is different than the amount and/or type of filler in the surface layers.

Embodiment 16 is the adhesive tape of any one of embodiments 1 through 15 wherein each layer of the multilayer film backing may be the same or different (e.g., same or different type and/or amount of filler, same or different type and/or amount of organic polymer, same or different type and/or amount of polyvinyl chloride, same or different type and/or amount of plasticizer).

Embodiment 17 is the adhesive tape of any one of embodiments 1 through 16 wherein each layer of the multilayer film backing comprises plasticized polyvinyl chloride (which may be the same or different, and which may be selected from filled and unfilled grades of polyvinyl chloride resins, and said polyvinyl chloride resin may be selected from available grades with K values of at least 50, or at least 60, or at least 70.

Embodiment 18 is the adhesive tape of any one of embodiments 1 through 17 wherein each layer of the multilayer film backing comprises one or more fillers.

Embodiment 19 is the adhesive tape of any one of embodiments 1 through 18 wherein one or more layers of the multilayer film backing comprises at least 0.01 wt-%, or at least 0.1 wt-%, or at least 1, or at least 5 wt-%, or at least 10 wt-%, or at least 15 wt-%, or at least 20 wt-%, of one or more fillers, in a layer.

Embodiment 20 is the adhesive tape of any one of embodiments 1 through 19 wherein one or more layers of the multilayer film backing comprise up to 80 wt-%, or up to 70 wt-%, or up to 60 wt-%, or up to 50 wt-%, or up to 40 wt-%, or up to 30 wt-%, of one or more fillers, in a layer.

Embodiment 21 is the adhesive tape of any one of embodiments 1 through 20 wherein the plasticized polyvinyl chloride comprises at least 10 wt-%, or at least 15 wt-%, or at least 20 wt-%, of one or more plasticizers, based on the total weight of the plasticized polyvinyl chloride.

Embodiment 22 is the adhesive tape of any one of embodiments 1 through 21 wherein the plasticized polyvinyl chloride comprises up to 60 wt-%, or up to 50 wt-%, or up to 40 wt-%, of one or more plasticizers, based on the total weight of the plasticized polyvinyl chloride.

Embodiment 23 is the adhesive tape of any one of embodiments 1 through 22 wherein the plasticized polyvinyl chloride comprises one or more plasticizers selected from the group consisting of an epoxidixed vegetable oil, an epoxidized linseed oil, a mineral oil, an acetylated castor oil, a hydrogenated castor oil, an acetylated stearate ester, a furandicarboxylate, a dianhydrohexitol diester of 2-ethylheptanoic acid, a phthalate compound (such as diisononyl phthalate (DINP), diisodecyl phthalate (DIDP), and di-2-ethylhexyl phthalate (DEHP)), a terephthalate compound (such as dioctyl terephthalate), an adipate compound (such as di-2-ethylhexyl adipate (DEHA), di-isobutyl adipate (DIBA), di-isodecyl adipate (DIDA), di-isononyl adipate (DINA), and di-tridecyl adipate (DTDA)), and a trimellitate (such as tris(2-ethylhexyl) trimellitate), a polymeric polyester-type plasticizer, and a combination thereof.

Embodiment 24 is the adhesive tape of any one of embodiments 1 through 23 wherein the one or more organic polymers comprise a polyolefin (such as high-density polyethylene (HDPE), low-density polyethylene (LDPE), and polypropylene (PP)), a polyvinyl polymer (such as polyvinyl chloride (PVC) and polyvinyl acetate (PVA)), a polyolefin-based copolymer (such as ethylene-methacrylic acid copolymer (EEMA) and ethylene-vinyl acetate copolymer (EVA)), a block copolymer (such as acrylic block copolymers and styrene-isoprene-vinyl acetate copolymer), a thermoplastic elastomer (TPE), or a combination thereof.

Embodiment 25 is the adhesive tape of any one of embodiments 1 through 24 wherein the pressure sensitive adhesive comprises an emulsion pressure sensitive adhesive, a solvent-borne pressure sensitive adhesive, a photo-polymerizable pressure sensitive adhesive, a hot melt pressure sensitive adhesive (i.e., hot melt extruded pressure sensitive adhesive), or a combination thereof.

Embodiment 26 is the adhesive tape of embodiment 25 wherein the pressure sensitive adhesive comprises an acrylic pressure sensitive adhesive, a rubber-based pressure sensitive adhesive, a vinyl alkyl ether pressure sensitive adhesive, a silicone pressure sensitive adhesive, a polyester pressure sensitive adhesive, a polyamide pressure sensitive adhesive, a urethane pressure sensitive adhesive, a fluorinated pressure sensitive adhesive, an epoxy pressure sensitive adhesive, a block copolymer-based pressure sensitive adhesive, or a combination thereof.

Embodiment 27 is the adhesive tape of embodiment 26 wherein the pressure sensitive adhesive comprises a rubber-based pressure sensitive adhesive.

Embodiment 28 is the adhesive tape of embodiment 27 wherein the rubber-based pressure sensitive adhesive comprises a styrene-butadiene copolymer, a styrene-isoprene-styrene copolymer, a polyisoprene homopolymer, a polybutadiene homopolymer, or a combination thereof.

Embodiment 29 is the adhesive tape of embodiment 28 wherein the rubber-based pressure sensitive adhesive comprises a polyisoprene homopolymer.

Embodiment 30 is the adhesive tape of embodiment 29 wherein the rubber-based pressure sensitive adhesive comprises a polyisoprene homopolymer and a styrene-isoprene-styrene copolymer.

Embodiment 31 is the adhesive tape of embodiment 29 or 30 wherein the rubber-based pressure sensitive adhesive comprises at least 13 wt-% of a polyisoprene homopolymer.

Embodiment 32 is the adhesive tape of any one of embodiments 29 through 31 wherein the rubber-based pressure sensitive adhesive comprises up to 42 wt-% of a polyisoprene homopolymer.

Embodiment 33 is the adhesive tape of any one of embodiments 29 through 32 wherein the rubber-based pressure sensitive adhesive comprises at least 13 wt-% of a styrene-isoprene-styrene copolymer.

Embodiment 34 is the adhesive tape of any one of embodiments 29 through 33 wherein the rubber-based pressure sensitive adhesive comprises up to 42 wt-% of a styrene-isoprene-styrene copolymer.

Embodiment 35 is the adhesive tape of any one of embodiments 27 through 34 wherein the rubber-based pressure sensitive adhesive further comprises an end-block reinforcing resin.

Embodiment 36 is the adhesive tape of any one of embodiments 27 through 35 wherein the rubber-based pressure sensitive adhesive further comprises a solid tackifying agent.

Embodiment 37 is the adhesive tape of any one of embodiments 27 through 36 wherein the rubber-based pressure sensitive adhesive further comprises a multifunctional crosslinking agent.

Embodiment 38 is the adhesive tape of any one of embodiments 1 through 37 wherein the primer is solventless.

Embodiment 39 is the adhesive tape of any one of embodiments 1 through 38 wherein the primer comprises an elastomeric polymer.

Embodiment 40 is the adhesive tape of embodiment 39 wherein the elastomeric polymer comprises an epoxidized polymer (e.g., an epoxidized conjugated diene polymer, an epoxidized butadiene-containing copolymer, an epoxidized styrene-butadiene copolymer, an epoxidized styrene-isoprene polymer, and an epoxidized acrylonitrile-butadiene copolymer).

Embodiment 41 is the adhesive tape of embodiment 40 wherein the epoxidized polymer comprises a concentration of epoxidized units of at least 0.5 wt-%.

Embodiment 42 is the adhesive tape of embodiment 41 wherein the elastomeric epoxidized polymer comprises an epoxidized conjugated diene polymer having a concentration of epoxidized units of at least 0.5 wt-%.

Embodiment 43 is the adhesive tape of embodiment 42 wherein the elastomeric epoxidized polymer comprises an epoxidized butadiene-containing copolymer having a concentration of epoxidized units of at least 0.5 wt-%.

Embodiment 44 is the adhesive tape of embodiment 42 wherein the elastomeric epoxidized polymer comprises an epoxidized styrene-butadiene copolymer having a concentration of epoxidized units of at least 0.5 wt-%.

Embodiment 45 is the adhesive tape of any one of embodiments 40 through 44 wherein the epoxidized polymer comprises a concentration of epoxidized units of at least 1 wt-%, or at least 2 wt-%, or at least 3 wt-%, or at least 4 wt-%, or at least 5 wt-%.

Embodiment 46 is the adhesive tape of any one of embodiments 40 through 45 wherein the epoxidized polymer comprises a concentration of epoxidized units of up to 10 wt-%.

SET 3—an Adhesive Tape with a Multilayer Backing, a Rubber-Based PSA, and a Primer Embodiment 1 is an adhesive tape comprising: a backing comprising a multilayer film comprising one or more organic polymers, wherein at least one layer comprises a plasticized polyvinyl chloride; a primer layer disposed on at least one major surface of the backing; and a rubber-based pressure sensitive adhesive layer disposed on the primer layer.

Embodiment 2 is the adhesive tape of embodiment 1 wherein the multilayer film backing comprises at least 2, or at least 3, or at least 4, or at least 5 layers.

Embodiment 3 is the adhesive tape of embodiment 1 or 2 wherein the multilayer film backing comprises up to 15, or up to 14, or up to 13, or up to 12, or up to 11, or up to 10 layers.

Embodiment 4 is the adhesive tape of any one of embodiments 1 through 3 wherein the multilayer film backing comprises a core and two surface layers.

Embodiment 5 is the adhesive tape of embodiment 4 wherein the core comprises one or more layers.

Embodiment 6 is the adhesive tape of any one of embodiments 1 through 5 wherein each layer of the multilayer film backing may be the same or different (e.g., same or different type and/or amount of organic polymer, same or different type and/or amount of polyvinyl chloride, same or different type and/or amount of plasticizer).

Embodiment 7 is the adhesive tape of any one of embodiments 1 through 6 wherein each layer of the multilayer film backing comprises plasticized polyvinyl chloride (which may be the same or different, and which may be selected from filled and unfilled grades of polyvinyl chloride resins, and said polyvinyl chloride resin may be selected from available grades with K values of at least 50, or at least 60, or at least 70.

Embodiment 8 is the adhesive tape of any one of embodiments 1 through 7 wherein the plasticized polyvinyl chloride comprises at least 10 wt-%, or at least 15 wt-%, or at least 20 wt-%, of one or more plasticizers, based on the total weight of the plasticized polyvinyl chloride.

Embodiment 9 is the adhesive tape of any one of embodiments 1 through 8 wherein the plasticized polyvinyl chloride comprises up to 60 wt-%, or up to 50 wt-%, or up to 40 wt-%, of one or more plasticizers, based on the total weight of the plasticized polyvinyl chloride.

Embodiment 10 is the adhesive tape of any one of embodiments 1 through 9 wherein the plasticized polyvinyl chloride comprises one or more plasticizers selected from the group consisting of an epoxidixed vegetable oil, an epoxidized linseed oil, a mineral oil, an acetylated castor oil, a hydrogenated castor oil, an acetylated stearate ester, a furandicarboxylate, a dianhydrohexitol diester of 2-ethyl-heptanoic acid, a phthalate compound (such as diisononyl phthalate (DINP), diisodecyl phthalate (DIDP), and di-2-ethylhexyl phthalate (DEHP)), a terephthalate compound (such as dioctyl terephthalate), an adipate compound (such as di-2-ethylhexyl adipate (DEHA), di-isobutyl adipate (DIBA), di-isodecyl adipate (DIDA), di-isononyl adipate (DINA), and di-tridecyl adipate (DTDA)), and a trimellitate (such as tris(2-ethylhexyl) trimellitate), a polymeric polyester-type plasticizer, and a combination thereof.

Embodiment 11 is the adhesive tape of any one of embodiments 1 through 10 wherein the one or more organic polymers comprise a polyolefin (such as high-density polyethylene (HDPE), low-density polyethylene (LDPE), and polypropylene (PP)), a polyvinyl polymer (such as polyvinyl chloride (PVC) and polyvinyl acetate (PVA)), a polyolefin-based copolymer (such as ethylene-methacrylic acid copolymer (EEMA) and ethylene-vinyl acetate copolymer (EVA)), a block copolymer (such as acrylic block copolymers and styrene-isoprene-vinyl acetate copolymer), a thermoplastic elastomer (TPE), or a combination thereof.

Embodiment 12 is the adhesive tape of embodiment 11 wherein the rubber-based pressure sensitive adhesive comprises a styrene-butadiene copolymer, a styrene-isoprene-styrene copolymer, a polyisoprene homopolymer, a polybutadiene homopolymer, or a combination thereof.

Embodiment 13 is the adhesive tape of embodiment 12 wherein the rubber-based pressure sensitive adhesive comprises a polyisoprene homopolymer.

Embodiment 14 is the adhesive tape of embodiment 13 wherein the rubber-based pressure sensitive adhesive comprises a polyisoprene homopolymer and a styrene-isoprene-styrene copolymer.

Embodiment 15 is the adhesive tape of embodiment 13 or 14 wherein the rubber-based pressure sensitive adhesive comprises at least 13 wt-% of a polyisoprene homopolymer.

Embodiment 16 is the adhesive tape of any one of embodiments 13 through 15 wherein the rubber-based pressure sensitive adhesive comprises up to 42 wt-% of a polyisoprene homopolymer.

Embodiment 17 is the adhesive tape of any one of embodiments 14 through 16 wherein the rubber-based pressure sensitive adhesive comprises at least 13 wt-% of a styrene-isoprene-styrene copolymer.

Embodiment 18 is the adhesive tape of any one of embodiments 14 through 17 wherein the rubber-based pressure sensitive adhesive comprises up to 42 wt-% of a styrene-isoprene-styrene copolymer.

Embodiment 19 is the adhesive tape of any one of embodiments 12 through 18 wherein the rubber-based pressure sensitive adhesive further comprises an end-block reinforcing resin.

Embodiment 20 is the adhesive tape of any one of embodiments 12 through 19 wherein the rubber-based pressure sensitive adhesive further comprises a solid tackifying agent.

Embodiment 21 is the adhesive tape of any one of embodiments 12 through 20 wherein the rubber-based pressure sensitive adhesive further comprises a multifunctional crosslinking agent.

Embodiment 22 is the adhesive tape of any one of embodiments 1 through 21 wherein the primer is solventless.

Embodiment 23 is the adhesive tape of any one of embodiments 1 through 22 wherein the primer comprises an elastomeric polymer.

Embodiment 24 is the adhesive tape of embodiment 23 wherein the elastomeric polymer comprises an epoxidized polymer (e.g., an epoxidized conjugated diene polymer, an epoxidized butadiene-containing copolymer, an epoxidized styrene-butadiene copolymer, an epoxidized styrene-isoprene polymer, and an epoxidized acrylonitrile-butadiene copolymer).

Embodiment 25 is the adhesive tape of embodiment 24 wherein the epoxidized polymer comprises a concentration of epoxidized units of at least 0.5 wt-%.

Embodiment 26 is the adhesive tape of embodiment 25 wherein the elastomeric epoxidized polymer comprises an epoxidized conjugated diene polymer having a concentration of epoxidized units of at least 0.5 wt-%.

Embodiment 27 is the adhesive tape of embodiment 26 wherein the elastomeric epoxidized polymer comprises an epoxidized butadiene-containing copolymer having a concentration of epoxidized units of at least 0.5 wt-%.

Embodiment 28 is the adhesive tape of embodiment 26 wherein the elastomeric epoxidized polymer comprises an epoxidized styrene-butadiene copolymer having a concentration of epoxidized units of at least 0.5 wt-%.

Embodiment 29 is the adhesive tape of any one of embodiments 24 through 28 wherein the epoxidized polymer comprises a concentration of epoxidized units of at least 1 wt-%, or at least 2 wt-%, or at least 3 wt-%, or at least 4 wt-%, or at least 5 wt-%.

Embodiment 30 is the adhesive tape of any one of embodiments 24 through 29 wherein the epoxidized polymer comprises a concentration of epoxidized units of up to 10 wt-%.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. An adhesive tape comprising:
   a backing comprising a multilayer film comprising one or more organic polymers, wherein each layer of the multilayer film backing comprises plasticized polyvinyl chloride having at least 25 wt-% polyvinyl chloride, based on the total weight of the layer, and at least one layer comprises one or more fillers;

a primer layer disposed on at least one major surface of the backing; and a pressure sensitive adhesive layer disposed on the primer layer, wherein the primer is solventless, wherein the primer layer comprises an elastomeric epoxidized polymer, wherein the epoxidized polymer comprises a concentration of epoxidized units of at least 0.5 wt-%.

2. The adhesive tape of claim 1 wherein the multilayer film backing comprises up to 15 layers.

3. The adhesive tape of claim 1 wherein the multilayer film backing comprises a core and two surface layers.

4. The adhesive tape of claim 3 wherein the core comprises one or more layers.

5. The adhesive tape of claim 4 wherein at least one layer of the core comprises one or more fillers.

6. The adhesive tape of claim 3 wherein each surface layer comprises one or more fillers.

7. The adhesive tape of claim 1 wherein each layer of the multilayer film backing comprises one or more fillers.

8. The adhesive tape of claim 1 wherein the pressure sensitive adhesive comprises an emulsion pressure sensitive adhesive, a solvent-borne pressure sensitive adhesive, a photo-polymerizable pressure sensitive adhesive, a hot melt pressure sensitive adhesive (i.e., hot melt extruded pressure sensitive adhesive), or a combination thereof.

9. The adhesive tape of claim 8 wherein the pressure sensitive adhesive comprises a rubber-based pressure sensitive adhesive.

10. The adhesive tape of claim 9 wherein the rubber-based pressure sensitive adhesive comprises a styrene-butadiene copolymer, a styrene-isoprene-styrene copolymer, a polyisoprene homopolymer, a polybutadiene homopolymer, or a combination thereof.

* * * * *